(12) United States Patent
Oshima et al.

(10) Patent No.: US 10,293,649 B2
(45) Date of Patent: May 21, 2019

(54) AMPHIBIOUS VEHICLE

(71) Applicant: MITSUBISHI HEAVY INDUSTRIES, LTD., Tokyo (JP)

(72) Inventors: Takaaki Oshima, Tokyo (JP); Satoru Ishikawa, Tokyo (JP); Takashi Matsunaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/544,994

(22) PCT Filed: Nov. 17, 2015

(86) PCT No.: PCT/JP2015/082290
§ 371 (c)(1),
(2) Date: Jul. 20, 2017

(87) PCT Pub. No.: WO2016/129161
PCT Pub. Date: Aug. 18, 2016

(65) Prior Publication Data
US 2017/0349017 A1 Dec. 7, 2017

(30) Foreign Application Priority Data

Feb. 10, 2015 (JP) .................................. 2015-024556

(51) Int. Cl.
*B63H 19/08* (2006.01)
*B60F 3/00* (2006.01)
(Continued)

(52) U.S. Cl.
CPC .......... *B60F 3/0046* (2013.01); *B60F 3/0007* (2013.01); *B60F 3/0038* (2013.01);
(Continued)

(58) Field of Classification Search
CPC .......... B60F 3/00; B60F 3/0015; B60F 3/003; B60F 3/0038; B60F 3/0046; B60F 3/0061;
(Continued)

(56) References Cited

U.S. PATENT DOCUMENTS

| 4,953,492 A | * | 9/1990 | Duffty | .................... B60F 3/0007 |
| | | | | 114/282 |
| 5,027,737 A | * | 7/1991 | Duffty | .................... B60F 3/0007 |
| | | | | 114/282 |

(Continued)

FOREIGN PATENT DOCUMENTS

| JP | 49-34315 Y | 9/1974 |
| JP | 9-76992 A | 3/1997 |

(Continued)

OTHER PUBLICATIONS

International Search Report and Written Opinion of the International Searching Authority (Forms PCT/ISA/210 and PCT/ISA/237) for International Application No. PCT/JP2015/082290, dated Jan. 19, 2016, with English translations.

*Primary Examiner* — Daniel V Venne
(74) *Attorney, Agent, or Firm* — Birch, Stewart, Kolasch & Birch, LLP

(57) ABSTRACT

An amphibious vehicle that can reduce wave drag at the time of hydroplaning and can improve propulsion performance of the vehicle body. The amphibious vehicle includes a vehicle body capable of moving on water and on land, a front flap with a rear end being fixed to a lower end of the vehicle body, a rear flap with a front end being fixed to a rear part of the vehicle body, and a pair of keels provided along a travel device provided on both sides of the vehicle body on a bottom surface of the vehicle body.

8 Claims, 6 Drawing Sheets

(51) Int. Cl.
*B63B 1/32* (2006.01)
*B63B 1/40* (2006.01)
*B63B 1/20* (2006.01)
*B63B 1/22* (2006.01)
*B63B 1/18* (2006.01)

(52) U.S. Cl.
CPC .............. *B63B 1/20* (2013.01); *B63B 1/22* (2013.01); *B63B 1/32* (2013.01); *B63B 1/40* (2013.01); *B63B 2001/183* (2013.01); *Y02T 70/125* (2013.01)

(58) Field of Classification Search
CPC .... B63B 1/20; B63B 1/22; B63B 1/32; B63B 1/36; B63B 2001/183; B63B 2001/20; B63B 2001/32; B63B 2001/325
USPC ........... 440/12.5, 12.51, 12.53, 12.54, 12.56; 114/282, 285
See application file for complete search history.

(56) References Cited

U.S. PATENT DOCUMENTS

| | | | | |
|---|---|---|---|---|
| 5,765,497 | A | * | 6/1998 | Thomas ................ B60F 3/0046 440/12.5 |
| 7,530,866 | B2 | * | 5/2009 | Darby ................... B60F 3/0038 114/285 |
| 8,002,596 | B2 | * | 8/2011 | Wernicke .............. B60F 3/0007 114/285 |
| 2007/0006788 | A1 | | 1/2007 | Lindsey |
| 2014/0150704 | A1 | | 6/2014 | Petromanolakis et al. |

FOREIGN PATENT DOCUMENTS

| | | |
|---|---|---|
| JP | 2007-501164 A | 1/2007 |
| JP | 2011-251596 A | 12/2011 |
| JP | 2013-154794 A | 8/2013 |
| JP | 2014-522778 A | 9/2014 |

\* cited by examiner

AMPHIBIOUS VEHICLE

FIELD

The present invention relates to an amphibious vehicle and, for example, relates to an amphibious vehicle in which a plate-like member is provided in a vehicle body.

BACKGROUND

Conventionally, a hull for an amphibious vehicle in which a keel is provided in the center of the bottom surface of the hull has been proposed (for example, see Patent Literature 1). In the hull for the amphibious vehicle, planing plates that cover a discontinuous portion in a planing surface of the hull are placed so as to be apart from the keel by an equal distance, whereby rigidity of the hull is increased to improve propulsion performance.

CITATION LIST

Patent Literature

Patent Literature 1: Japanese Patent Application National Publication No. 2007-501164 A1

SUMMARY

Technical Problem

In the amphibious vehicle, studies to improve the propulsion performance at the time of hydroplaning by providing flaps respectively at the front and back of the vehicle have been performed. However, even if the flaps are provided respectively at the front and back of the vehicle, there are cases where a sufficient lift force that acts on the vehicle body is not acquired and wave drag acting on the vehicle body increases, such as when the vehicle hydroplanes at a high speed (for example, 14 kilometers/hour or faster). Therefore, sufficient propulsion performance is not always acquired at the time of hydroplaning.

The present invention has been achieved in view of these actual situations, and an object of the present invention is to provide an amphibious vehicle that can reduce wave drag at the time of hydroplaning and can improve the propulsion performance of the vehicle body.

Solution to Problem

An amphibious vehicle according to the present invention includes a vehicle body capable of moving on water and on land, a front plate-like member (a front flap) with a rear end being fixed to a lower end of the vehicle body, a rear plate-like member (a rear flap) with a front end being fixed to a rear part of the vehicle body, and a pair of flow straightening members (a pair of keels) provided along crawl tracks provided on both sides of the vehicle body on a bottom surface of the vehicle body.

According to this configuration, at the time of hydroplaning of the amphibious vehicle, a water flow from the front side of the vehicle body toward the lower surface side of the vehicle body through a lower surface side of the front flap is straightened by the pair of keels to flow to the rear side of the vehicle body. Therefore, occurrence of a water flow pushed out to the both sides of the vehicle body by the bottom surface of the vehicle body can be prevented. Accordingly, the amphibious vehicle can prevent occurrence of the water flow being into contact with the travel device on the lower side of the vehicle body, thereby enabling to decrease the wave drag at the time of hydroplaning and improve the propulsion performance by reducing the resistance acting on the vehicle body.

In the amphibious vehicle according to the present invention, it is preferable that the pair of keels is provided to cover side surfaces of the travel device. According to this configuration, the water flow on the lower side of the vehicle body can be sufficiently straightened by the keels. Therefore, contact between the travel device and the water flow on the lower side of the vehicle body can be prevented, thereby enabling to further reduce the wave drag at the time of hydroplaning.

In the amphibious vehicle according to the present invention, it is preferable that the pair of keels extends from a front end of the vehicle body to a rear end thereof. According to this configuration, the water flow on the lower side of the vehicle body can be sufficiently straightened by the pair of keels. Therefore, contact between the travel device and the water flow on the lower side of the vehicle body can be prevented, thereby enabling to further reduce the wave drag at the time of hydroplaning.

In the amphibious vehicle according to the present invention, it is preferable that the front flap has a curved portion at a rear end thereof. According to this configuration, a connection portion between the vehicle body and the front flap becomes a smooth state. Therefore, the water flow flowing to the lower surface side can be prevented from containing air. Further, the water flow that does not contain air flows toward the rear flap on the rear side of the vehicle body while being further straightened by the pair of keels, thereby enabling to further reduce the wave drag with respect to the vehicle body.

In the amphibious vehicle according to the present invention, it is preferable that the front flap includes a lower flap with a rear end thereof being fixed to a lower end of a front surface of the vehicle body, and an upper flap coupled to a front end of the lower flap so as to be pivotally movable relative to the lower flap. According to this configuration, the amphibious vehicle can fold and house the front flap provided on the front side of the vehicle body. Therefore, when the amphibious vehicle lands from on water, the front flap can be housed compactly on the front surface of the vehicle body.

In the amphibious vehicle according to the present invention, it is preferable that the front flap is fixed to the vehicle body so as to be pivotally movable on a connection portion with the vehicle body used as a rotation axis. According to this configuration, the amphibious vehicle can adjust the lift force acting on the vehicle body by pivotally moving the front flap. Therefore, the amphibious vehicle can take an optimum vehicle posture at all times with respect to waves against the vehicle body, thereby enabling not only to increase the highest speed but also to suppress oscillation of the vehicle body, which can improve the ride quality and increase the safety.

In the amphibious vehicle according to the present invention, it is preferable that the rear flap is fixed to the vehicle body so as to be pivotally movable on a connection portion with the vehicle body used as a rotation axis. According to this configuration, the amphibious vehicle can adjust the lift force acting on the vehicle body by pivotally moving the rear flap. Therefore, the amphibious vehicle can take an optimum vehicle posture at all times with respect to waves against the vehicle body, thereby enabling not only to increase the highest speed but also to suppress oscillation of the vehicle body, which can improve the ride quality and increase the safety.

In the amphibious vehicle according to the present invention, it is preferable that the front flap is fixable to a front surface of the vehicle body. According to this configuration, the amphibious vehicle can fix the front flap on the front surface of the vehicle body. Therefore, the front flap can be housed compactly on the front surface of the vehicle body.

In the amphibious vehicle according to the present invention, it is preferable that the rear flap is fixable to a rear surface of the vehicle body. According to this configuration, the amphibious vehicle can fix the rear flap on the rear surface of the vehicle body. Therefore, the rear flap can be fixed compactly on the rear surface of the vehicle body.

Advantageous Effects of Invention

According to the present invention, an amphibious vehicle that can reduce wave drag at the time of hydroplaning and can improve the propulsion performance of the vehicle body can be realized.

DESCRIPTION OF EMBODIMENTS

Embodiments of the present invention are described below in detail with reference to the accompanying drawings. The present invention is not limited to the following embodiments and can be achieved with appropriate modifications. Common constituent elements in respective embodiments are denoted by like reference signs and redundant descriptions thereof will be omitted.

First Embodiment

Figure 1:
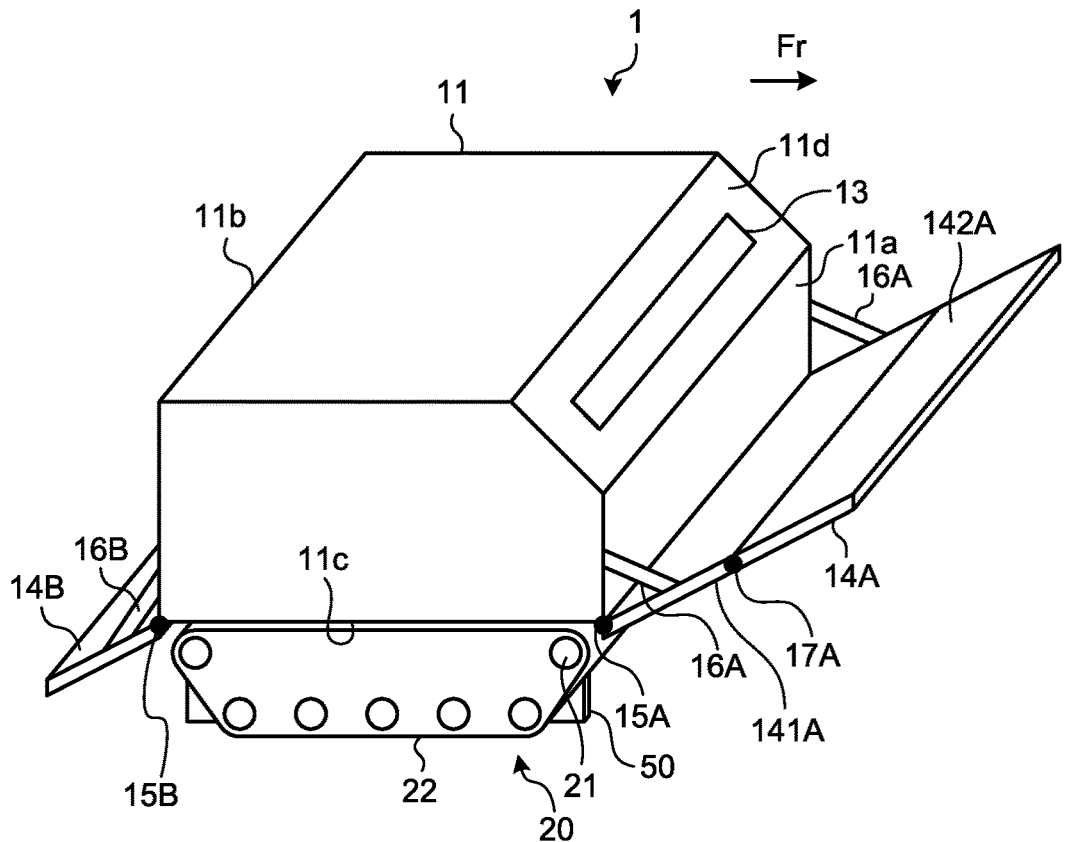
FIG. 1 is a schematic perspective view of an amphibious vehicle according to a first embodiment.
Figure 2:
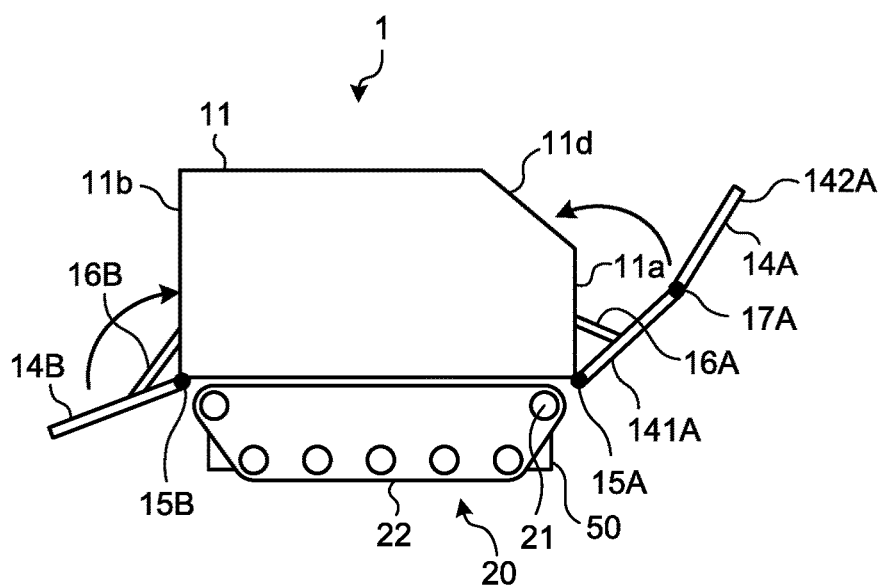
FIG. 2 is a side view of the amphibious vehicle according to the first embodiment.
Figure 3:
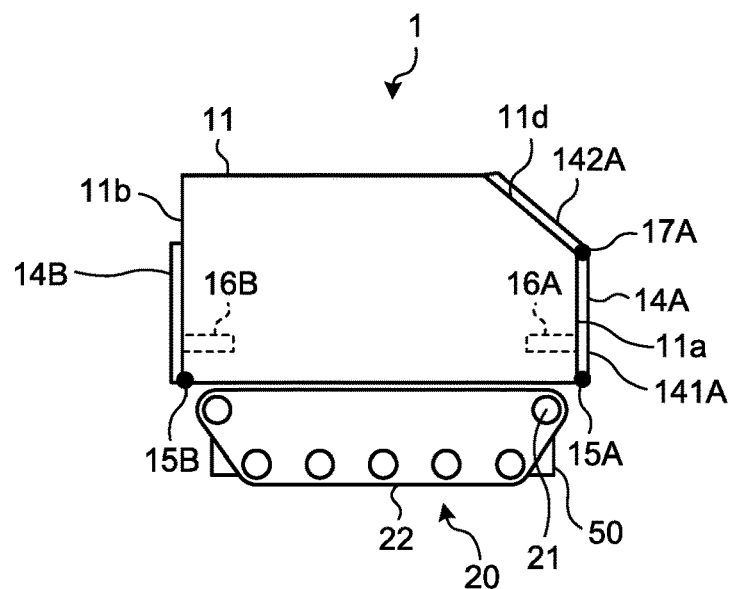
FIG. 3 is a side view of the amphibious vehicle according to the first embodiment.

FIG. 1 is a schematic perspective view of an amphibious vehicle 1 according to a first embodiment of the present invention. FIGS. 2 and 3 are side views of the amphibious vehicle 1 according to the first embodiment of the present invention. As illustrated in FIGS. 1 to 3, the amphibious vehicle 1 according to the present embodiment includes a generally-cuboidal vehicle body 11 and a travel device 20 provided on a lower part of both sides of the vehicle body 11. The vehicle body 11 is provided with a propulsor (not illustrated) including a propeller or a water-jet device to be used in a hydroplaning mode. The travel device 20 includes a sprocket 21 rotationally driven by a drive unit (not illustrated) such as an engine, and crawler tracks 22 rotationally driven by the sprocket 21. In the amphibious vehicle 1, a vehicle window 13 is provided on an upper part of a front surface 11a in a traveling direction Fr of the vehicle body 11, so that a driver can view outside from the vehicle window 13. In FIG. 1, an example in which the vehicle body 11 is driven by the travel device 20 including the crawler tracks 22 is described. However, a travel device including tires instead of the crawler tracks 22 can be used.

One end of a front flap (front plate-like member) 14A is fixed to a lower end of the front surface 11a of the vehicle body 11. The front flap 14A is attached to the lower end of the front surface 11a of the vehicle body 11 via a hinge 15A, so that a principal surface 14a (see FIG. 5) is inclined with respect to the front surface 11a of the vehicle body 11. The front flap 14A has a width corresponding to the vehicle width of the vehicle body 11. The front flap 14A includes a lower flap (lower plate-like member) 141A with one end being fixed to the lower end of the front surface 11a of the vehicle body 11, and an upper flap (upper plate-like member) 142A with one end being fixed to the other end of the lower flap 141A via a hinge 17A. The front flap 14A is attached to the lower end of the vehicle body 11 via an extendable support member 16A with one end being fixed to the lower end of the vehicle body 11 so that the principal surface 14a forms a predetermined angle θ1 (see FIG. 5) with the front surface 11a of the vehicle body 11.

The lower flap 141A has a principal surface having a width corresponding to the front surface 11a of the vehicle body 11, and is fixed to the lower end of the front surface 11a of the vehicle body 11 to be pivotally movable relative to the front surface 11a of the vehicle body 11 via the hinge 15A and the support member 16A. The upper flap 142A has a principal surface having a width corresponding to an inclined surface 11d of the vehicle body 11, and is fixed to the lower flap 141A to be pivotally movable relative thereto via the hinge 17A. The lower flap 141A is configured to be fixable to the front surface 11a of the vehicle body 11 by a fixing member (not illustrated). The upper flap 142A is configured to be fixable to the inclined surface 11d of the front surface 11a of the vehicle body 11 by a fixing member (not illustrated). The support member 16A is provided in an extendable manner in the front and back direction in the traveling direction of the vehicle body 11.

In the lower flap 141A, the principal surface can be fixed to be pivotally movable with respect to the front surface 11a of the vehicle body 11 by driving the hinge 15A by a drive unit (not illustrated), or the principal surface can be fixed to be pivotally movable with respect to the front surface 11a of the vehicle body 11 by driving the support member 16A by a drive unit (not illustrated). Further, in the upper flap 142A, the principal surface can be fixed to be pivotally movable with respect to the front surface 11a of the vehicle body 11 by driving the hinge 17A by a drive unit (not illustrated).

One end of a rear flap 14B is fixed to a lower end of a rear surface 11b of the vehicle body 11. The rear flap 14B is attached to the lower end of the rear surface 11b of the vehicle body 11 via a hinge 15B, so that a principal surface 14b (see FIG. 5) is inclined with respect to the rear surface 11b of the vehicle body 11. The rear flap 14B has a width corresponding to the vehicle width of the vehicle body 11. The rear flap 14B is attached to the lower end of the vehicle body 11 via an extendable support member 16B with one end being fixed to the lower end of the vehicle body 11 so that the principal surface 14b forms a predetermined angle θ2 (see FIG. 5) with the rear surface 11b of the vehicle body 11.

In the amphibious vehicle 1, the rear flap 14B on the side of the rear surface 11b of the vehicle body 11 is fixed to be pivotally movable relative to the rear surface 11b of the vehicle body 11 via the hinge 15B. The rear flap 14B is configured to be fixable to the rear surface 11b of the vehicle body 11 by a fixing member (not illustrated). In the rear flap 14B, the principal surface 14b can be fixed to be pivotally movable with respect to the rear surface 11b of the vehicle body 11 by driving the hinge 15B by a drive unit (not illustrated), or the principal surface can be fixed to be pivotally movable with respect to the rear surface 11b of the vehicle body 11 by driving the support member 16B by a drive unit (not illustrated).

In the amphibious vehicle 1, for example, at the time of traveling on land, the lower flap 141A of the front flap 14A can be fixed to the front surface 11a of the vehicle body 11 and the upper flap 142A can be fixed to the inclined surface 11d. In the amphibious vehicle 1, the rear flap 14B can be fixed to the rear surface 11b of the vehicle body 11. The support member 16A can be housed in a housing space (not illustrated) provided on the front surface 11a of the vehicle body 11, and the support member 16B can be housed in a housing space (not illustrated) provided on the rear surface 11b of the vehicle body 11. In this manner, by configuring the front flap 14A provided on the front side of the vehicle body 11 with the lower flap 141A and the upper flap 142A, which are foldable with each other, so as to be foldable, the front flap 14A can be compactly fixed to the front surface 11a of the vehicle body 11 when the amphibious vehicle 1 lands from on water. The rear flap 14B provided on the rear side of the vehicle body 11 can be similarly fixed to the rear surface 11b of the vehicle body 11 compactly.

On a bottom surface 11c of the vehicle body 11, a pair of keels (flow straightening members) 50 are provided along the travel device 20 provided on the lower part of the both sides of the vehicle body 11. The keels 50 are formed in a substantially-cuboidal shape, extend from the front side to the rear side of the vehicle body 11, and are provided near the travel device 20. Further, the keels 50 are provided to cover the sides of a lower part of the travel device 20. By providing the keels 50 in this manner, the both sides of the vehicle body 11 are covered with the keels 50, so that pressure acting on the vehicle body 11 is increased, and the water flow flowing on the lower part of the vehicle body 11 at the time of hydroplaning of the amphibious vehicle 1 is straightened to increase the lift force acting on the vehicle body 11. Therefore, at the time of hydroplaning of the amphibious vehicle 1, a buoyant force acting on the entire vehicle body 11 increases, thereby enabling to realize reduction of the resistance against the vehicle body 11. In the present embodiment, an example in which the keels 50 are formed in the substantially-cuboidal shape is described. However, the shape of the keels 50 is not particular limited to any specific shape so long as the keels 50 can straighten the water flow flowing on the lower surface side of the vehicle body 11 at the time of hydroplaning of the vehicle body 11 to stabilize the posture of the vehicle body 11. For example, various shapes such as a polygonal columnar shape such as a triangular prism shape, and a cylindrical shape can be used.

Figure 4:
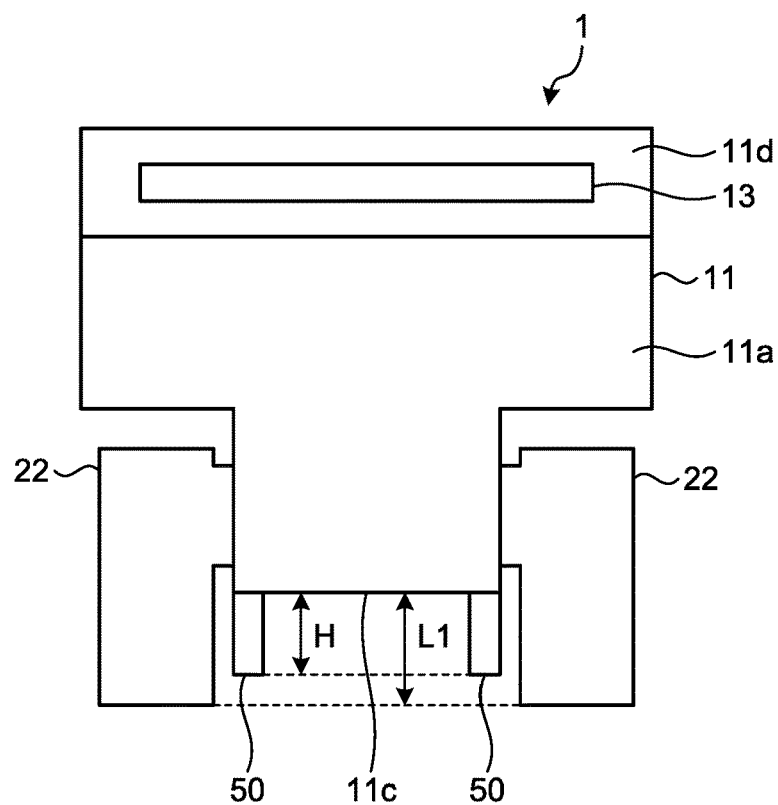
FIG. 4 is a schematic front view of the amphibious vehicle according to the first embodiment.

FIG. 4 is a schematic front view of the amphibious vehicle 1 according to the present embodiment. In FIG. 4, the front flap 14A is omitted for convenience sake of explanation. As illustrated in FIG. 4, the pair of keels 50 are respectively provided at the both ends of the bottom surface 11c of the vehicle body 11. The keels 50 are attached to the lower surface of the vehicle body 11 so that a height H from the vehicle bottom surface 11c to a lower side of the vehicle body 11 becomes slightly shorter than a distance L1 between the bottom surface 11c of the vehicle body 11 and lower surfaces of the crawler tracks 22 of the travel device 20. By providing the pair of keels 50 in this manner, contact between the pair of keels 50 and a road surface can be prevented when the amphibious vehicle 1 travels on land. Further, because inner side surfaces of the crawler tracks 22 of the travel device 20 can be sufficiently covered with the pair of keels 50, a buoyant force produced by the pair of keels 50 can be acquired sufficiently when the amphibious vehicle 1 travels on water, thereby enabling to reduce the wave drag acting on the vehicle body 11. It is not always required to provide the pair of keels 50 at the both ends on the bottom surface 11c of the vehicle body 11, and can be provided at both end portions. The height H of the keels 50 can be appropriately changed within a range in which effects of the present invention are obtained.

Figure 5:
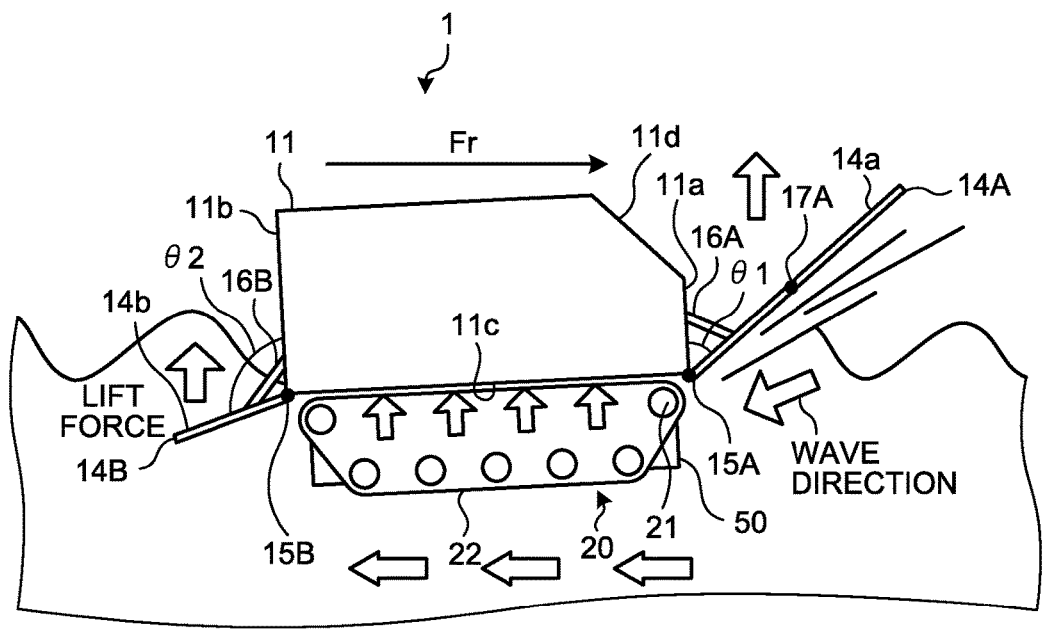
FIG. 5 is a side view of the amphibious vehicle according to the first embodiment at the time of hydroplaning.

A general operation of the amphibious vehicle 1 according to the present embodiment is described next. FIG. 5 is a side view of the amphibious vehicle 1 at the time of hydroplaning. As illustrated in FIG. 5, in the amphibious vehicle 1 according to the present embodiment, the front flap 14A is attached to the lower end of the front surface 11a of the vehicle body 11 in such a manner that the principal surface 14a of the front flap 14A forms an acute angle θ1 with respect to the front surface 11a of the vehicle body 11. Accordingly, at the time of hydroplaning of the amphibious vehicle 1, waves on water flow to the rear side from the lower surface of the front flap 14A through the bottom surface 11c of the vehicle body 11. Therefore, the lift force acts from a lower side to an upper side on the side of the front surface 11a of the vehicle body 11, thereby enabling to reduce the wave drag from the front surface 11a of the vehicle body 11. As a result, even if the amphibious vehicle 1 travels on water at a high speed (for example, 14 kilometers/hour or faster), the vehicle body 11 becomes a planing type, and thus the posture of the vehicle body 11 is stabilized and submersion of the front part of the vehicle body 11 can be prevented. From a viewpoint of further improving the operational effects described above, it is preferable that the front flap 14A be provided at the bottom end of the front surface 11a of the vehicle body 11.

Figure 6A:
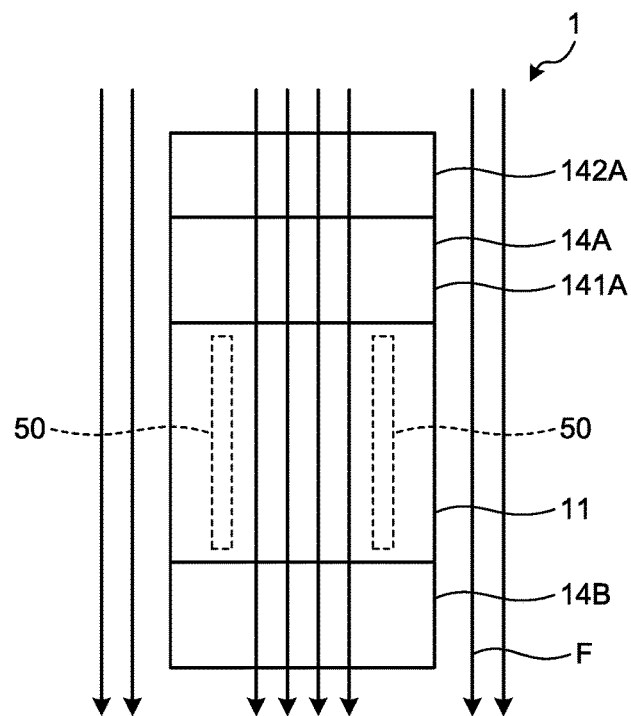
FIG. 6A is an explanatory diagram of a water flow with respect to the amphibious vehicle according to the first embodiment.
Figure 6B:
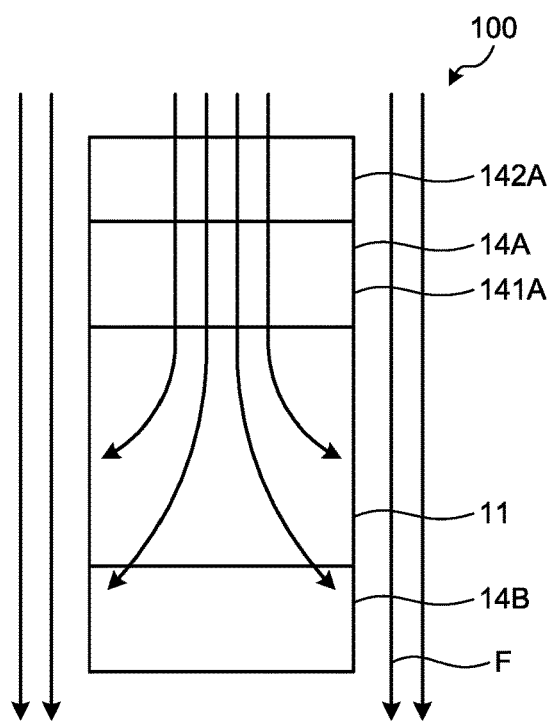
FIG. 6B is an explanatory diagram of a water flow with respect to the amphibious vehicle according to the first embodiment.

In the amphibious vehicle 1 according to the present embodiment, the water flows from the front side of the vehicle body 11 to the rear side of the vehicle body 11 while the flow is straightened by the pair of keels 50 provided on the bottom surface 11c of the vehicle body 11. FIG. 6A and FIG. 6B are explanatory diagrams of water flows with respect to the amphibious vehicle 1. As illustrated in FIG. 6A, in the amphibious vehicle 1 provided with the pair of keels 50, a water flow F flowing from the lower side of the front flap 14A toward the lower side of the vehicle body 11 is straightened by the pair of keels 50. Therefore, an increase of the wave drag with respect to the vehicle body 11 due to contact between the travel device 20 provided on the lower part of the vehicle body 11 and the water flow F can be prevented. In contrast thereto, as illustrated in FIG. 6B, in an amphibious vehicle 100 that is not provided with the pair of keels 50, the water flow F flowing from the lower side of the front flap 14A toward the lower side of the vehicle body 11 is pushed out to the both sides of the vehicle body 11 by the lower surface of the vehicle body 11 to be into contact with the travel device 20 provided on the lower part of the vehicle body 11, thereby increasing the wave drag acting on the vehicle body 11.

Further, in the amphibious vehicle 1 according to the present embodiment, the rear flap 14B is attached to the lower end of the rear surface 11b of the vehicle body 11 in such a manner that the principal surface 14b of the rear flap 14B forms an obtuse angle θ2 with respect to the rear surface 11b of the vehicle body 11. Accordingly, at the time of hydroplaning of the amphibious vehicle 1, a water flow where waves on water are straightened by the pair of keels 50 on the bottom surface 11c of the vehicle body 11 moves to the rear side of the vehicle body 11 through the lower surface of the rear flap 14B. Therefore, a large lift force from the lower side to the upper side of the vehicle body 11 acts from the lower surface side of the rear flap 14B, and also occurrence of swirls or the like at the both side ends of the rear flap 14B can be prevented. Accordingly, even if the amphibious vehicle 1 travels on water at a high speed (for example, 14 kilometers/hour or faster), the vehicle body 11 becomes a planing type, and thus wave drag from the side of the front surface 11a of the vehicle body 11 can be decreased. Further, the posture of the vehicle body 11 is stabilized and submersion of a rear part of the vehicle body 11 can be prevented. From a viewpoint of further improving the operational effects described above, it is preferable that the rear flap 14B be provided at the bottom end of the rear surface 11b of the vehicle body 11.

As described above, according to the amphibious vehicle 1 of the present embodiment, at the time of hydroplaning of the amphibious vehicle 1, the water flow from the front side of the vehicle body 11 toward the lower surface side of the vehicle body 11 through the lower surface side of the front flap 14A is straightened by the pair of keels 50 and flows to the rear side of the vehicle body 11. Therefore, occurrence of a water flow to the both sides of the vehicle body 11 due to the bottom surface 11c of the vehicle body 11 can be prevented. Accordingly, the amphibious vehicle 1 can prevent contact on the lower side of the vehicle body 11 between the travel device 20 and the water flow on the lower side of the vehicle body 11, thereby enabling to decrease the wave drag at the time of hydroplaning and improve the propulsion performance by reducing the resistance acting on the vehicle body 11.

In the embodiment described above, an example in which flat plate-like members are used as the front flap 14A and the rear flap 14B has been described. However, the shapes of the front flap 14A and the rear flap 14B can be appropriately changed to plate-like members other than the flat plate, such as a corrugated plate, within the range in which effects of the present invention can be obtained. Similarly, the lower flap 141A and the upper flap 142A can be appropriately changed to plate-like members other than the flat plate, such as a corrugated plate, within the range in which effects of the present invention can be obtained. Further, the width of the front flap 14A and the rear flap 14B can be appropriately changed within the range in which effects of the present invention can be obtained. In the present embodiment, the example in which the front flap 14A and the rear flap 14B are attached to the vehicle body 11 by the hinges 15A and 15B has been described. However, the front flap 14A and the rear flap 14B are not necessarily fixed using the hinges 15A and 15B, so long as the principal surface 14a or 14b thereof can be fixed at the predetermined angle θ1 or θ2 formed with the front surface 11a or the rear surface 11b of the vehicle body 11. Further, in the present embodiment, the example in which the front flap 14A and the rear flap 14B are fixed to the vehicle body 11 by the support members 16A and 16B has been described. However, the front flap 14A and the rear flap 14B are not necessarily fixed to the vehicle body 11 via the support members 16A and 16B. In the embodiment described above, the example in which the front flap 14A is configured by two plate-like members, that is, the lower flap 141A and the upper flap 142A has been described. However, the front flap 14A can be configured by one plate-like member.

Second Embodiment

A second embodiment of the present invention is described next. In the following descriptions, differences from the first embodiment described above are mainly explained and redundant descriptions are omitted.

Figure 7:
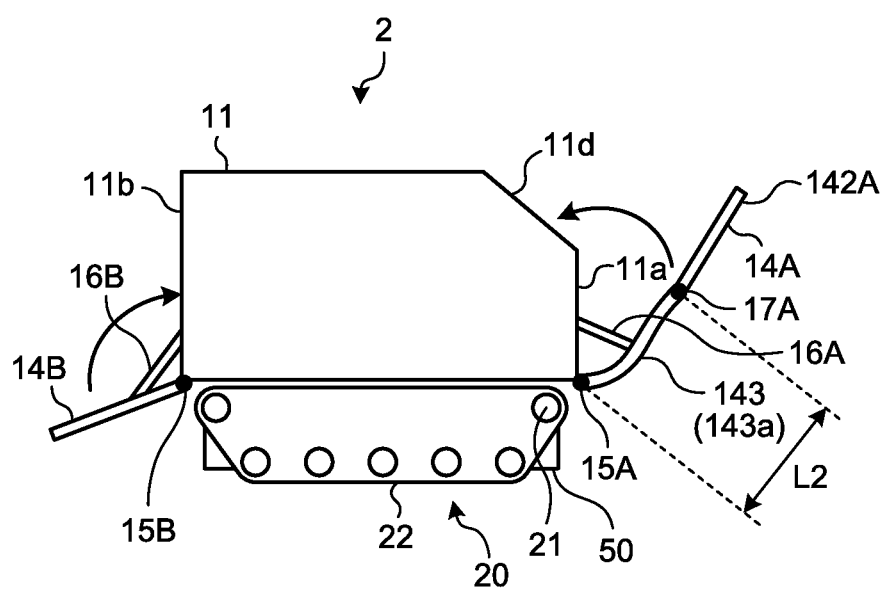
FIG. 7 is a side view of an amphibious vehicle according to a second embodiment of the present invention.

FIG. 7 is a side view of an amphibious vehicle 2 according to the second embodiment of the present invention. The amphibious vehicle 2 according to the present embodiment includes a lower flap 143 with a curved rear end, which is a connection portion with the vehicle body 11, instead of the lower flap 141A of the front flap 14A of the amphibious vehicle 1 according to the first embodiment described above. The lower flap 143 has a curved portion 143a having a radius of curvature of, for example, about $\frac{2}{5}R$ to $\frac{4}{5}R$ with respect to a distance L2 to a connection portion between the lower flap 143 and the upper flap 142A. Therefore, using the lower flap 143 having the curved portion 143a, the connection portion between the lower flap 143 and the vehicle body 11 can be smoothed. Other configurations are identical to those in the amphibious vehicle 1 according to the first embodiment and thus descriptions thereof are omitted.

Figure 8A:
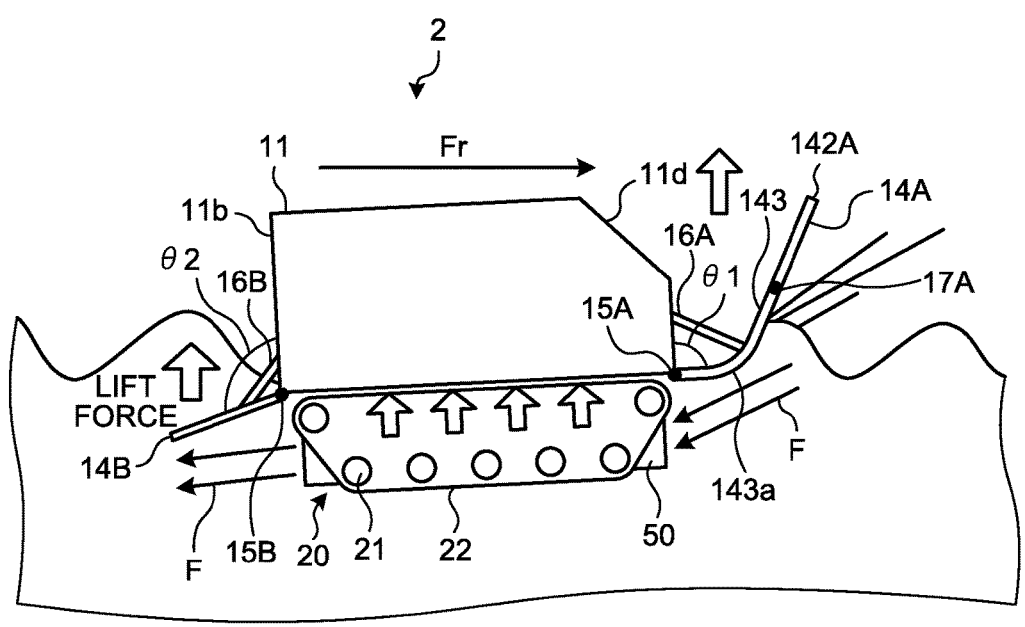
FIG. 8A is an explanatory diagram of a water flow at the time of hydroplaning of the amphibious vehicle according to the second embodiment.
Figure 8B:
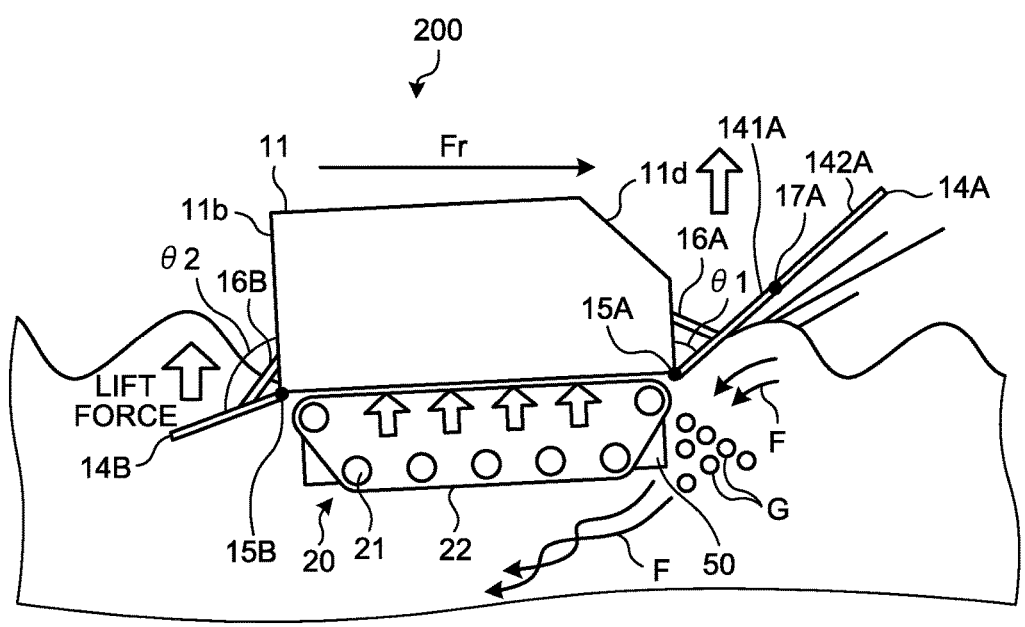
FIG. 8B is an explanatory diagram of a water flow at the time of hydroplaning of the amphibious vehicle according to the second embodiment.

FIG. 8A and FIG. 8B are explanatory diagrams of water flows at the time of hydroplaning of the amphibious vehicle 2 according to the second embodiment. As illustrated in FIG. 8A, when the amphibious vehicle 2 including the lower flap 143 provided with the curved portion 143a travels on water, water from the front side of the vehicle body 11 flows toward the lower side of the vehicle body 11 through the lower surface of the lower flap 143. Because the connection portion between the lower flap 143 and the vehicle body 11 becomes a smooth state due to the curved portion 143a, the water flow F flowing from the lower side of the lower flap 143 to the lower surface side of the vehicle body 11 does not contain air G and is straightened, so that a disturbed flow is not generated. The water flow F that does not contain air G flows toward the rear flap 14B on the rear side of the vehicle body 11, while being further straightened by the pair of keels 50. Accordingly, the wave drag with respect to the vehicle body 11 can be further reduced.

In contrast thereto, as illustrated in FIG. 8B, when an amphibious vehicle 200 including the lower flap 141A not provided with the curved portion 143a travels on water, water from the front side of the vehicle body 11 flows to the lower side of the vehicle body 11 through the lower surface side of the front flap 14A. Because the respective members are in a sharp state at the connection portion between the lower flap 141A and the vehicle body 11, water flowing from the lower side of the lower flap 141A to the lower surface side of the vehicle body 11 contains air G. Further, the water flow F flowing on the lower surface side of the vehicle body 11 becomes a disturbed water flow or a separated water flow, to affect also the flow acting on the rear flap 14B and the vehicle body 11, thereby increasing the wave drag with respect to the vehicle body 11.

REFERENCE SIGNS LIST

1, 2, 100, 200 amphibious vehicle
11 vehicle body
11a front surface
11b rear surface
11c bottom surface
11d inclined surface
13 vehicle window
14A front flap (front plate-like member)
141A, 143 lower flap (lower plate-like member)
142A upper flap (upper plate-like member)
143a curved portion
14B rear flap (rear plate-like member)
15A, 15B hinge
16A, 16B support member
17A hinge
20 travel device
21 sprocket
22 crawler track
50 keel (flow straightening member)

The invention claimed is:

1. An amphibious vehicle comprising:
   a vehicle body capable of moving on water and on land;
   a front flap with a rear end being fixed to a lower end of the vehicle body;
   a rear flap with a front end being fixed to a rear part of the vehicle body;
   crawler tracks provided on both sides of the vehicle body on a bottom surface of the vehicle body; and
   a pair of keels provided along the crawler tracks, each keel being provided on one side of the vehicle body on a bottom surface of the vehicle body and covering an inner side surface of a crawler track.

2. The amphibious vehicle according to claim 1, wherein each keel extends from a front end of the vehicle body to a rear end thereof.

3. The amphibious vehicle according to claim 1, wherein the front flap has a curved portion at a rear end thereof.

4. The amphibious vehicle according to claim 1, wherein the front flap includes a lower flap with a rear end thereof being fixed to a lower end of a front surface of the vehicle body, and an upper flap coupled to a front end of the lower flap thereby being pivotally movable relative to the lower flap.

5. The amphibious vehicle according to claim 1, wherein the front flap is fixed to the vehicle body thereby being pivotally movable on a connection portion with the vehicle body used as a rotation axis.

6. The amphibious vehicle according to claim 1, wherein the rear flap is fixed to the vehicle body thereby being pivotally movable on a connection portion with the vehicle body used as a rotation axis.

7. The amphibious vehicle according to claim 1, wherein the front flap is fixable to a front surface of the vehicle body.

8. The amphibious vehicle according to claim 1, wherein the rear flap is fixable to a rear surface of the vehicle body.

* * * * *